(12) United States Patent
Gevrekci (10) Patent No.: US 9,262,806 B2
(45) Date of Patent: Feb. 16, 2016

(54) SYSTEM AND METHOD FOR RESOLUTION ENHANCEMENT (75) Inventor: Lutfi Murat Gevrekci, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 53 days.

(21) Appl. No.: 14/238,735

(22) PCT Filed: Dec. 12, 2011

(86) PCT No.: PCT/IB2011/055614
§ 371 (c)(1),
(2), (4) Date: Feb. 13, 2014

(87) PCT Pub. No.: WO2013/088197
PCT Pub. Date: Jun. 20, 2013

(65) Prior Publication Data
US 2014/0193041 A1    Jul. 10, 2014

(51) Int. Cl.
G06T 5/00 (2006.01)
G06K 9/00 (2006.01)
G01S 17/89 (2006.01)
G06T 3/40 (2006.01)
G06T 7/00 (2006.01)
G06T 7/20 (2006.01)

(52) U.S. Cl.
CPC . *G06T 5/00* (2013.01); *G01S 17/89* (2013.01); *G06K 9/00355* (2013.01); *G06T 3/4076* (2013.01); *G06T 5/002* (2013.01); *G06T 7/0051* (2013.01); *G06T 7/20* (2013.01); *G06T 7/2073* (2013.01)

(58) Field of Classification Search
None
See application file for complete search history.

(56) References Cited

U.S. PATENT DOCUMENTS 7,852,461 B2 * 12/2010 Yahav ............... G01S 17/023 356/3.01
2009/0073419 A1 * 3/2009 Gesner et al. ........ G01B 11/026 356/73

OTHER PUBLICATIONS

Murat Gevrekci et al:"Depth map super resolution", Image Prcessing(ICIP),2011 18th IEEE International Conference on, IEEE, Sep. 11, 2011(2011-09-11), pp. 3449-3452 XP032080436, DOI:10.1109/ICIP.2011.6116454 ISBN:978-1-4577-1304-0 p. 3450-p. 3451.

Murat Gevrekci et al:"Superresolution under Photometric Diversity of Images", EURASIP Journal on Advances in Signal Processing vol. 2007, No. 1, 1 Jan. 2007, p. 036076, XP55037069, ISSN: 1687-6180, DOI:10.1155/2007/36076 p. 2-p. 3 p. 4-p. 7.

Hiroyuki et al:"High Resolution and High Dynamic Range Image Reconstruction from Differently Exposed Images", Dec. 1, 2008, Advances in Visual Computing: 4th International Symposium, ISVC 2008, Las Vegas, NV,USA, December 1-3, 2008, Prceedings, Part II, Spiringer,pp. 713-722,XP019112275,ISBN:978-3-540-89645-6 p. 716-p. 718; figures 3,4.

(Continued)

*Primary Examiner* — Utpal Shah
(74) *Attorney, Agent, or Firm* — Gokalp Bayramoglu (57) ABSTRACT The present invention relates to a system (1) and method (100) for resolution enhancement which enables the depth resolution to be enhanced without using gimbal, performs depth description independent from lighting conditions and camera parameters in high resolution.

12 Claims, 5 Drawing Sheets

(56) References Cited

OTHER PUBLICATIONS

Gevrekci M et al "Image Acquisition Modeling for Super-Resolution Reconstruction", Image Processing, 2005, ICIP 2005. IEEE International Conference on, Piscataway, NJ, USA, IEEE, vol. 2, Sep. 11, 2005, pp. 1058-1061, XP010851239. DOI:10.1109/ICIP.2005.1530241 ISBN:978-0-7803-9134-5 p. 2.

Schuon S et al: "LidarBoost: Depth superresolution for ToF 3D shape scanning". Computer Vision and Patern Recognition, 2009.CVPR 2009, IEEE Conference on, Piscataway, NJ, USA, Jun. 20, 2009, pp. 343-350, XP031607331, ISBN:978-1-4244-3992-8 p. 345-p. 346.

\* cited by examiner

SYSTEM AND METHOD FOR RESOLUTION ENHANCEMENT

FIELD OF THE INVENTION

The present invention relates to a system and method for resolution enhancement which enables depth resolution to be increased in image processing techniques.

BACKGROUND OF THE INVENTION

Structure from motion technique which deals with object motion analysis is frequently used in acquiring depth information. The aforementioned technique is based on performing depth analysis by associating images taken from different angles. However, point association is a cumbersome task in textureless regions and is a time consuming task.

State of art reconstruction techniques such as structured lightening, stereo vision and laser scanning involve several parts or moving gimbals which complicate the deployment of the system they are used. Demand for time of flight (ToF) camera systems which are compact than aforementioned systems is gradually increasing. Although there has been progress in depth imaging and reconstruction techniques, existing systems can only acquire limited part of the depth within the working volume with limited resolution. However the systems to be used are expected to perform depth descriptions independent from the lighting conditions and camera parameters and produce high resolution output.

United States patent document no U.S. Pat. No. 6,137,566, an application known in the state of the art, discloses a method and apparatus for processing signal for the laser radar receivers. The said apparatus comprises comparators which compares the output of the photo-detector with an adjustable threshold level.

United States patent document no U.S. Pat. No. 7,511,801, an application known in the state of the art, discloses a system or method for automatic gain control of sensors in time-of-flight systems. In the said method, the overexposed and underexposed pixels are compared, and accordingly the light reaching the pixels is adjusted by changing at least one parameter.

United States patent document no US2009073419, an application known in the state of the art, discloses a dual resolution, dual range sensor system and a method. It is disclosed in the said document that in an operation mode of the system, a low resolution profile of the region wanted to be scanned is developed and high resolution scanning is performed using this profile.

SUMMARY OF THE INVENTION

The objective of the present invention is to realize a system and method for resolution enhancement which enables depth resolution to be increased in image processing techniques.

A further objective of the present invention is to realize a system and method for resolution enhancement without using a gimbal or a mechanical part Another objective of the present invention is to realize a system and method for resolution enhancement wherein the depth information coming from the different parts of the working volume are combined using different camera integration times.

Yet another objective of the present invention is to realize a system and method for resolution enhancement which performs depth descriptions independent from lighting conditions and camera parameters in high resolution.

DETAILED DESCRIPTION OF THE INVENTION

The system and method for resolution enhancement developed to fulfill the objective of the present invention is illustrated in the accompanying figure wherein.

The parts seen in the figures are each given a reference numeral where the numerals refer to the following:
1. Resolution enhancement system
2. Imaging unit
3. Data transfer unit
   31. Exposure generation module
   32. Offset generation module
   33. Data transfer module
4. Database
5. Motion unit
6. Control unit
7. Gradient buffer
8. Image buffer Different exposure times used during image acquisition can also be called as "Integration Time".

Figure 1:
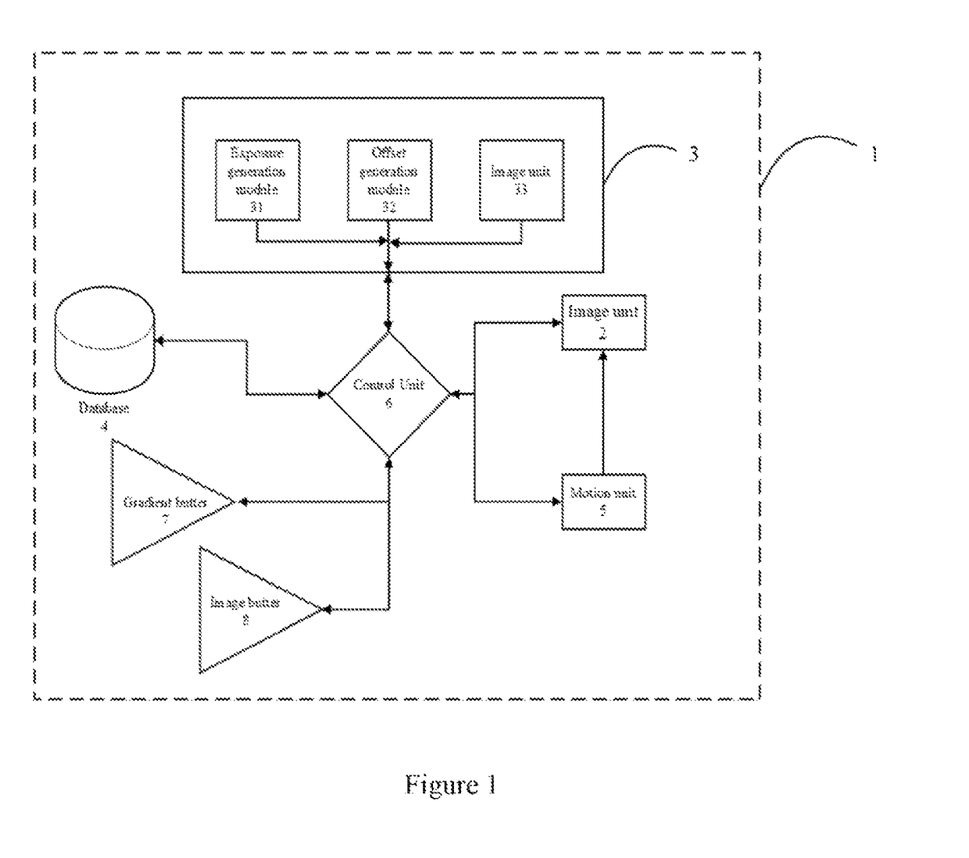
FIG. 1 is the schematic view of the resolution enhancement system.

The inventive resolution enhancement system (1) comprises:
at least one imaging unit (2) which enables to get image,
at least one data transfer unit (3) which has at least one exposure generation module (31) enabling different exposure times to be generated for the images to be taken, at least one offset generation module (32) enabling the data about the offset of the imaging unit (2) to be generated, and at least one data transfer module (33) enabling the data to be received and transferred,
at least one database (4) which enables the images acquired to be stored,
at least one motion unit (5) which enables the movement of the imaging unit (2) in tree dimension according to the data acquired by the offset generation module (32),
at least control unit (6) which enables the acquired images to be processed,
at least one gradient buffer (7) wherein the differences between the images are stored,
at least one image buffer (8) wherein the high resolution depth image is stored.

Figure 3:
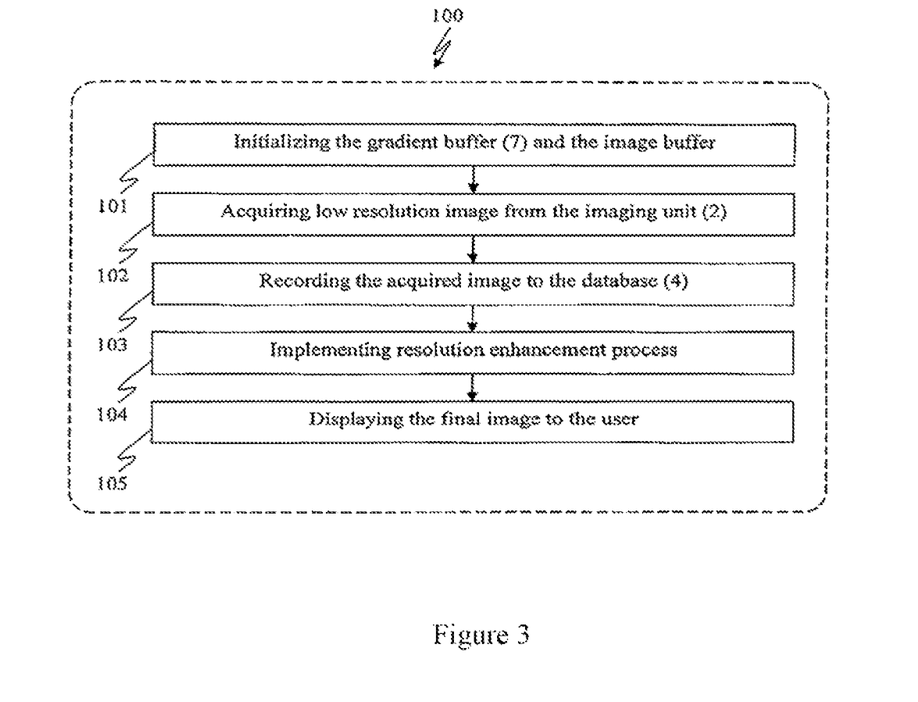
FIG. 3 is the flowchart of the resolution enhancement method.

The inventive resolution enhancement method (100) comprises the steps of
initializing the gradient buffer (7) and the image buffer (8) (101),
acquiring low resolution image from the imaging unit (2) using data received from the exposure generation module (31) and offset generation module (32) (102),
registering the image received to the database (4) (103),
implementing resolution enhancement process (104),
displaying the final image to the user (105).

Figure 4:
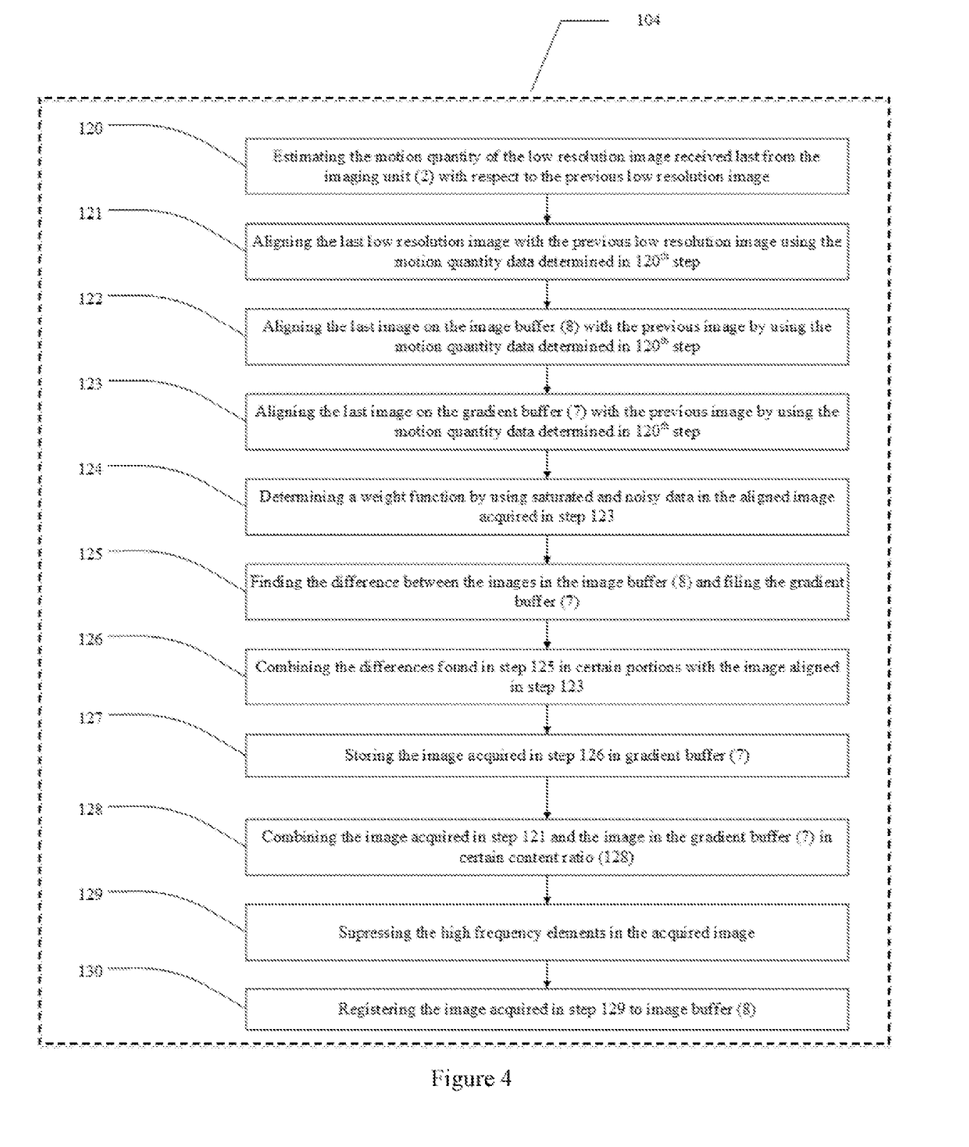
FIG. 4 is the flowchart of the sub-steps of $104^{th}$ step of the resolution enhancement method.

In the preferred embodiment of the invention, the step of implementing resolution enhancement process (104) comprises the sub-steps of
- determining the sub-pixel motion of the low resolution image received last from the imaging unit (2) according to the previous low resolution image (120),
- aligning the last low resolution image spatially with the previous low resolution image using the motion quantity data determined in $120^{th}$ step (121),
- aligning the last image on the image buffer (8) with the previous image using the sub-pixel level motion determined in $120^{th}$ step (122),
- aligning the last image on the gradient buffer (7) with the previous image by using the motion quantity estimated in $120^{th}$ step (123),
- determining a weight function by using saturated and noisy data in the aligned image acquired in step 123 (124),
- computing the gradient buffer (7) and finding the difference between images in buffer (8)(125),
- averaging differences found in step 125 in certain portions to the image aligned in step 123 (126),
- storing the image acquired in step 126 in gradient buffer (7) (127),
- combining the image acquired in step 121 and the image in the gradient buffer (7) in certain content ratio (128),
- suppressing the high frequency elements in the acquired image (129),
- registering the image acquired in step 129 to image buffer (8) (130).

Figure 5:
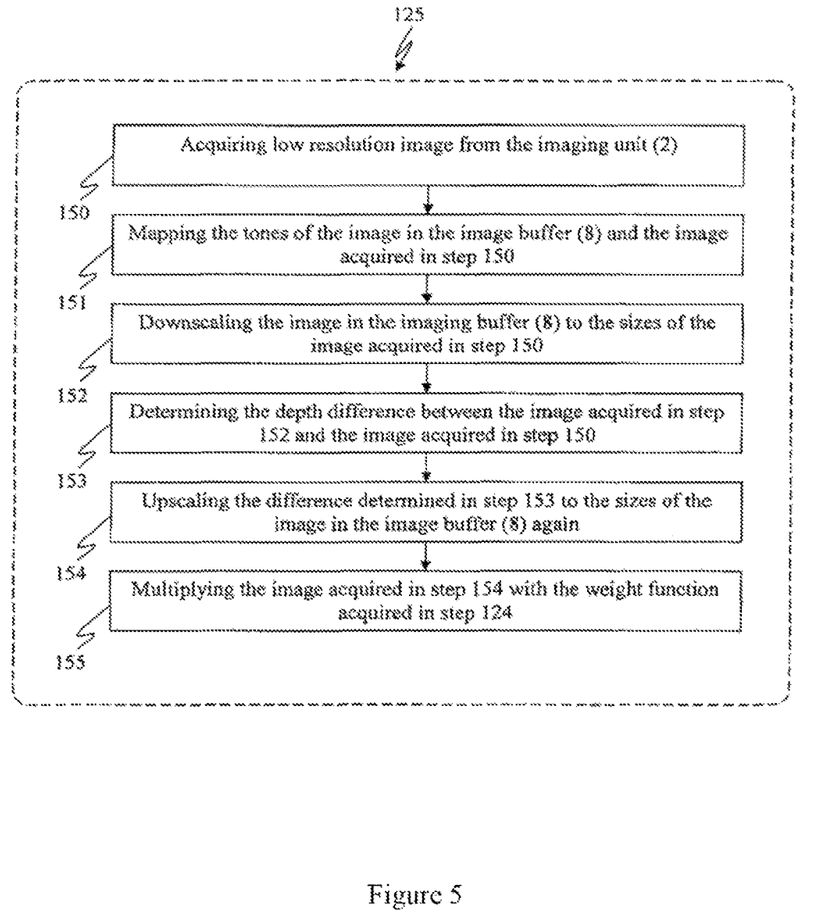
FIG. 5 is the flowchart of the sub-steps of $125^{th}$ step of the resolution enhancement method.

In the preferred embodiment of the invention, the step of finding the difference between the images in the image buffer (8) and computing the gradient buffer (7) (125) comprises the sub steps of
- acquiring low resolution image from the imaging unit (2) (150),
- photometric adjustment of the image in the image buffer (8) and the image acquired in step 150 (151),
- downscaling the image in the imaging buffer (8) to the sizes of the image acquired in step 150 (152),
- determining the depth difference between the image acquired in step 152 and the image acquired in step 150 (153),
- upscaling the difference determined in step 153 to the sizes of the image in the image buffer (8) again (154),
- multiplying the image acquired in step 154 with the weight function acquired in step 124 (155).

Since the inventive resolution enhancement system (1) has no image information when it is activated, the gradient buffer (7) and the image buffer (8) are initialized to value 0 (101). Then, the motion unit (5) moves the imaging unit (2) by using the data generated by the offset generation module (32), meanwhile the imaging unit (2) takes low resolution images according to the data generated by the exposure generation module (31) (102). These images are recorded to the database (4) (103). The acquired images are processed with resolution enhancement process (104). Then, the final images produced by processing resolution enhancement are displayed to the user (105).

Figure 2:
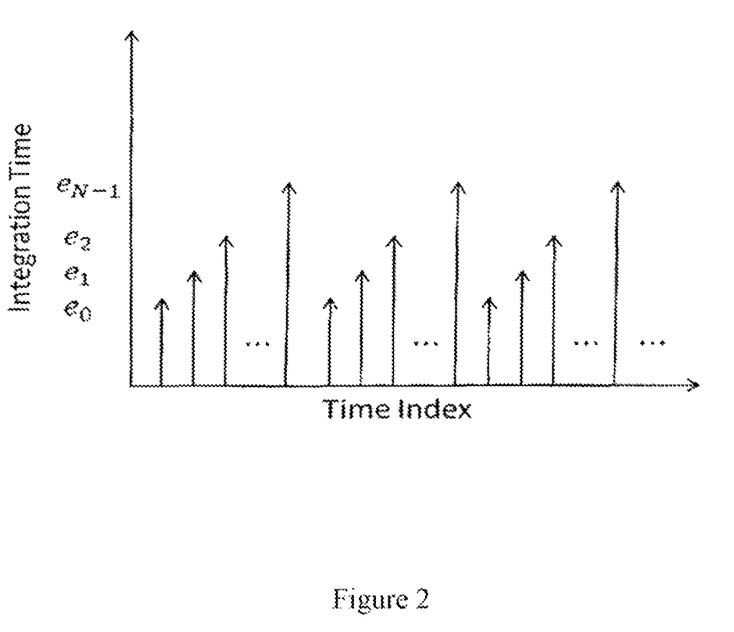
FIG. 2 is the one possible sequence of integration time change with time index.

In the preferred embodiment of the invention, the step of taking low resolution image from the imaging unit (2) by using the data received from the exposure generation module (31) and the offset generation module (32) (in other words step 102) is repeated by using a different exposure and offset information generated by exposure generation module (31) and the offset generation module (32), respectively.

In a preferred embodiment of the invention, in step of implementing resolution enhancement processes (in other words step 104) the following processes are implemented.

The control unit (6) compares the last low resolution image received from the imaging unit (2) and the last registered low resolution image in the database (4), and determines the motion quantity between these images at sub-pixel level (120). The last low resolution image received and the last low resolution image in the database (4) are aligned using the estimated motion (121). The high resolution image stored in buffer (8) is aligned with the image acquired previously using the offset quantity information determined in step 120 (122). The image stored in the gradient buffer (7) is aligned with the image acquired previously using the offset quantity information determined in step 120 (123). Then, the saturated and the noisy points in the image acquired in step 123 are extracted and a weight function is determined using these contaminated pixels (124). Then the differences between the images in the gradient buffer (7) and in the image buffer (8) are computed (125). The differences found in step 125 are implemented in certain portions to the image aligned in step 123 (126). The image acquired by implementing these differences is stored in gradient buffer (7) (127). Then, the image stored in the gradient buffer (7) and the image acquired in step 121 are combined using a step size (128). And then, the high frequency elements acquired in step 128 are suppressed (129). Next, the image acquired in step 129 is registered to image buffer (8) (130).

In the preferred embodiment of the invention, the step of finding the difference between the images in the gradient buffer (7) and in the image buffer (8) (in other words step 125) the following steps are performed:

First low resolution image is acquired from the imaging unit (2) (150). The acquired image is photometrically aligned with the image in the image buffer (8) (151). Then the image present in the image buffer (8) is downscaled to the size of the image acquired in step 150 (152). After that, the depth difference between the image acquired in step 152 and the image acquired in step 150 is determined (153). The acquired depth difference information is upscaled to the size of the image in the image buffer (8) again (154). Then these differences upscaled to the sizes of the image in the image buffer (8) are multiplied with the weight function acquired in step 124 (155).

In the preferred embodiment of the invention, downscaling process in step 152 is realized by skipping certain amount of pixels located after each pixel taken from the image present in the image buffer (8). In the said embodiment, the number of the pixels to be skipped corresponds to resolution enhancement factor which is the ratio of the image size in the image buffer (8) and the size of the depth difference information.

In the preferred embodiment of the invention, upscaling process in step 154 is realized by inserting zero-bit as much as the ratio of the image in the image buffer (8) and the sizes of the depth difference information between two pixels in the depth difference information. The said process is called as "upscaling with zero insertion".

The inventive resolution enhancement system (1) comprises at least one imaging unit (2) which enables image acquisition for depth reconstruction purposes. The exposure time which the imaging unit (2) will use during acquisition the said images is determined according to the exposure information generated by the exposure generation module (32) which the data transfer unit (3) has. The motion unit (5) that generates the motion of the imaging unit (2) in three dimensions moves the imaging unit (2) by using the information generated by the offset generation module (32). By this means, the imaging unit (2) acquires images in varying exposure times and from different views. The acquired images are recorded to the database (4). The high resolution image acquired by processing the images according to the resolution enhancement method (100) steps is displayed to the user via a screen (not shown in the figures).

The control unit (6) transfers the images acquired by the imaging unit (2) to the database (4) and these images are stored in the database (4).

In the preferred embodiment of the invention, in determining the motion quantity of the low resolution image last received from the imaging unit (2) compared to the previous low resolution image (in other words step 120), the image is subjected to a contrast stretching process according to the pixel intensity set and then a corner (feature) detection algorithm such as Harris Corner Detector algorithm is applied to the said image in order to produce a three-dimensional corner response map. In this embodiment, the correlation matrix at a spatial located is computed as follow:

$$A(x, y; I_c) = \begin{pmatrix} \sum_{(m,n) \in N} \left[\frac{\partial}{\partial x} I_c(m, n)\right]^2 & \sum_{(m,n) \in N} \left[\frac{\partial}{\partial x} I_c[m, n]\right]\left[\frac{\partial}{\partial y} I_c(m, n)\right] \\ \sum_{(m,n) \in N} \left[\frac{\partial}{\partial x} I_c(m, n)\right]\left[\frac{\partial}{\partial y} I_c(m, n)\right] & \sum_{(m,n) \in N} \left[\frac{\partial}{\partial y} I_c(m, n)\right]^2 \end{pmatrix}$$

Here, $$\frac{\partial}{\partial x}(\cdot), \frac{\partial}{\partial y}(\cdot)$$

are the gradient operators in vertical and horizontal direction, respectively. And then the cornerness response is computed according to the formula R $(x,y;c)$=det $A(x,y;l_c)$−k(traceA(x, y;$l_c$))$^2$. In here, "k" is the cornerness response coefficient, and it is generally selected approximately 0.04. In here, (x,y) are the horizontal and vertical coordinates of the point which is computed for attribute, respectively. And (m,n) is the horizontal and vertical indices within the window neighborhood (N) taken around the feature point. In this embodiment, contrast stretching process is determined according to the following formula:

$$I_c(m, n) = f_c(I(m, n)) = \frac{1}{1 + e^{-\gamma(I(m,n)-c)}}$$

$l_c$ is the image to which the contrast stretching is applied, l is the raw image, and $f_c$ symbolizes the contrast stretching function, whose slope is determined by γ and center is denoted as c, which lies within the range of [0,1].

In the preferred embodiment of the invention, the similarity of the corners is determined with normalized cross correlation formula.

$$\rho_{A,B} = \frac{\sum_{i=1}^{n}(A_i - \overline{A})(B_i - \overline{B})}{\sqrt{\sum_{i=1}^{n}(A_i - \overline{A})^2}\sqrt{\sum_{i=1}^{n}(B_i - \overline{B})^2}}$$

A and B represent the blocks to be taken around the feature in the images to be aligned. n corresponds to the number of the pixels inside blocks.

In the preferred embodiment of the invention, at least two images are taken from the imaging unit (2) and the said images are stored in the database (4). The control unit (6) uses the former of the said images as geometric reference and computes the residue by aligning the latter with the said reference. In this embodiment the mean depth of the images is computed according to the following formula in step 153.

$$FP_i(l_1, l_2) = \sum_{n_1, n_2} h_i(l_1, l_2; n_1, n_2)\hat{q}_N(n_1, n_2)$$

Here, i is image index, $l_1, l_2$ are the spatial index of the low resolution image, $n_1, n_2$ are the spatial indexes in high resolution image, $\hat{q}_N$ is the normalized irradiance value. Then a residual computation is performed according to the following formula by using mean depth information and raw depth $D_i$.

$$r_i(l_1, l_2) = D_i(l_1, l_2) - FP_i(l_1, l_2)$$

In the preferred embodiment of the invention, gradient buffer is accumulated using amnesic mean (in other words in $126^{th}$ step) according to the formula $$\bar{I}_{m+1} = \left(\frac{m-l}{m+1}\right)\bar{I}_m + \left(\frac{1+l}{m+1}\right)I_{m+1}.$$

In this formula, $\bar{I}_{m+1}$ is the resultant gradient value stored in gradient buffer, and l is the value computed according to the l=λm value. m is the time index, and λ is the amnesic factor which determines the forgetting factor. Amnesic mean adapts to the temporal change in gradient and ensures that gradients do not dominate the image mean.

In the preferred embodiment of the present invention, in step of averaging the differences found in step 125 in certain ratios to the image aligned in step 123 (in other words in the step 126), the stated ratios are acquired using step size computed with the methods of "steepest descent" or "conjugate gradient" known in the state of the art. In this embodiment, the image buffer is updated according to $x_{m+1} = x_m + \alpha \bar{I}_{m+1}$ formula (in other words in the step 128). In the formula, α is the step size, $x_{m+1}$ is the super-resolution image at time (m+1), $x_m$ is the super-resolution image at time m.

In the preferred embodiment of the present invention, in step off pressing the high frequency elements in the acquired image (in other words in step 129), the suppressing process is realized according to the following formula.

$$\hat{q}_N(n_1, n_2) = \frac{f^{-1}(\hat{q}(n_1, n_2))}{\alpha_i}$$

In the formula, q is the irradiance value, n1 and n2 are planar coordinates, α is the camera integration time and f is optoelectric circuit functions that also incorporates the weighting function computed in step 124 to suppress noisy and saturated sensor values.

It is possible to develop a wide variety of embodiments of the inventive system (1) and method (100) for resolution enhancement. The invention cannot be limited to the examples described herein and it is essentially according to the claims.

The invention claimed is:

1. A resolution enhancement method (100) enabling images acquired in low resolution to become high resolution, the method comprising the steps of:
   S101, initializing a gradient buffer (7) and an image buffer;
   S102, acquiring a plurality of low resolution images from an imaging unit (2) at different time instances using data received from an exposure generation module (31) and an offset generation module (32);
   S103, recording the low resolution images received to a database (4);
   S120, determining a motion quantity of a second low resolution image received most recently from the imaging unit (2) with respect to a first low resolution image received from the imaging unit previously;
   S121, aligning the second low resolution image with the first low resolution image using the motion quantity estimated in step S120 to acquire a third image;
   S122, aligning an image stored in the image buffer (8) with the first low resolution image by using the motion quantity estimated in step S120;
   S123, aligning an image stored in the gradient buffer (7) with the first low resolution image by using the motion quantity estimated in step S120 to acquire a fourth image with saturated and noisy data;
   S124, determining a weight function by using the saturated and noisy data;
   S125, computing differences between a plurality of images stored in the image buffer and storing the differences into the gradient buffer (7);
   S126, averaging the differences in step S125 in a ratio to the fourth image aligned in step S123 to acquire a fifth image;
   S127, storing the fifth image acquired in step S126 in the gradient buffer (7);
   S128, combining the third image acquired in step S121 and the fifth image stored in the gradient buffer (7) by using a step size in a content ratio to acquire a sixth image;
   S129, suppressing high frequency elements in the sixth image to acquire a seventh image;
   S130, registering the seventh image acquired in step S129 to the image buffer (8);
   S105, displaying a final reconstructed super-resolution image.

2. The resolution enhancement method (100) according to claim 1, wherein the gradient buffer is updated according to $x_{m+1} = x_m + \alpha I_{m+1}$ in step of storing the fifth image acquired in step S126 in the gradient buffer (7) S127, wherein $\alpha$ is a step size, $x_{m+1}$ is a super-resolution image at time (m+1), $x_m$ is a super-resolution image at time m, $I_{m+1}$ is as resultant gradient value stored in gradient buffer.

3. The resolution enhancement method (100) according to claim 1, wherein the suppressing and photometric normalization process is realized according to $$\hat{q}_N(n_1, n_2) = \frac{f^{-1}(\hat{q}(n_1, n_2))}{\alpha_i}$$

in step of suppressing high frequency elements in the sixth image (129), wherein q is an irradiance value, $q_N$ is a normalized irradiance value, $n_1$ and $n_2$ are planar coordinates, $\alpha_i$ is a camera integration time and f is an optoelectric circuit function.

4. The resolution enhancement method (100) according to claim 1, wherein the step of computing differences between the images in the gradient buffer (7) and in the image buffer (8) comprising the sub-steps of:
   S150, acquiring at least one low resolution image from the imaging unit (2);
   S151, adjusting a tonal range of the image in the image buffer with respect to the low resolution image acquired in step S150;
   S152, downscaling the image in the imaging buffer (8) to the size of the low resolution image acquired in step S150 to acquire an eighth image;
   S153, determining a depth difference between the eighth image acquired in step S152 and the low resolution image acquired in step S150;
   S154, upscaling the depth difference determined in step S153 to the size of the image in the image buffer (8) again to acquire a ninth image;
   S155, multiplying the ninth image acquired in step S154 with the weight function acquired in step.

5. The resolution enhancement method (100) according to claim 1, further comprising repeating taking the low resolution images from the imaging unit (2) by using the data received from the exposure generation module (31) and the offset generation module (32) by using different exposure and offset information generated by the exposure generation module (31) and the offset generation module (32).

6. The resolution enhancement method (100) according to claim 1, wherein in step of determining the motion quantity or the second low resolution image last received from the imaging unit (2) with respect to the first low resolution image, the first low resolution image and the second low resolution image are subjected to a contrast stretching process according to a pixel intensity set.

7. The resolution enhancement method (100) according to claim 6, wherein the contrast stretching process is performed according to $$f_c(l(x, y)) = \frac{1}{1 + e^{-\gamma(l(x,y)-c)}},$$

l is a raw image, $f_c$ symbolizes a contrast stretch function, (x,y) are horizontal and vertical indices within.

8. The resolution enhancement method (100) according to claim 1, wherein a corner detection algorithm is applied to the first low resolution image and the second low resolution image in order to produce a three-dimensional corner response map invariant to photometric variations.

9. The resolution enhancement method (100) according to claim 8, wherein a similarity of corners is computed according to $$\rho_{A,B} = \frac{\sum_{i=1}^{n}(A_i - \overline{A})(B_i - \overline{B})}{\sqrt{\sum_{i=1}^{n}(A_i - \overline{A})^2}\sqrt{\sum_{i=1}^{n}(B_i - \overline{B})^2}},$$

A and B represent blocks to be taken around the feature in the images to be aligned, n corresponds to a number of the pixels inside blocks.

10. The resolution enhancement method (100) according to claim 4, wherein the depth difference between the eighth image acquired in step S152 and the low resolution image acquired in step S150 is determined by computing a mean depth information of the images and performing a residual computation according to the computed difference.

11. The resolution enhancement method (100) according to claim 10, wherein the mean depth computation is performed according to $$FP_i(l_1, l_2) = \sum_{n_1, n_2} h_i(l_1, l_2; n_1, n_2)\hat{q}_N(n_1, n_2),$$

$FP_i$ is the mean depth, l is image index, $l_1$, $l_2$ are spatial indexes of low resolution image, $n_1$, $n_2$ are the spatial indexes in high resolution image, $q_k$ is the normalized irradiance value.

12. The resolution enhancement method (100) according to claim 10, wherein the residual computation is performed according to $r_i(l_1,l_2)=D_i(l_1,l_2)-FP_i(l_1,l_2)$, $r_i$ is the residual computation, $D_i$ is a raw depth.

* * * * *